Figure 1:
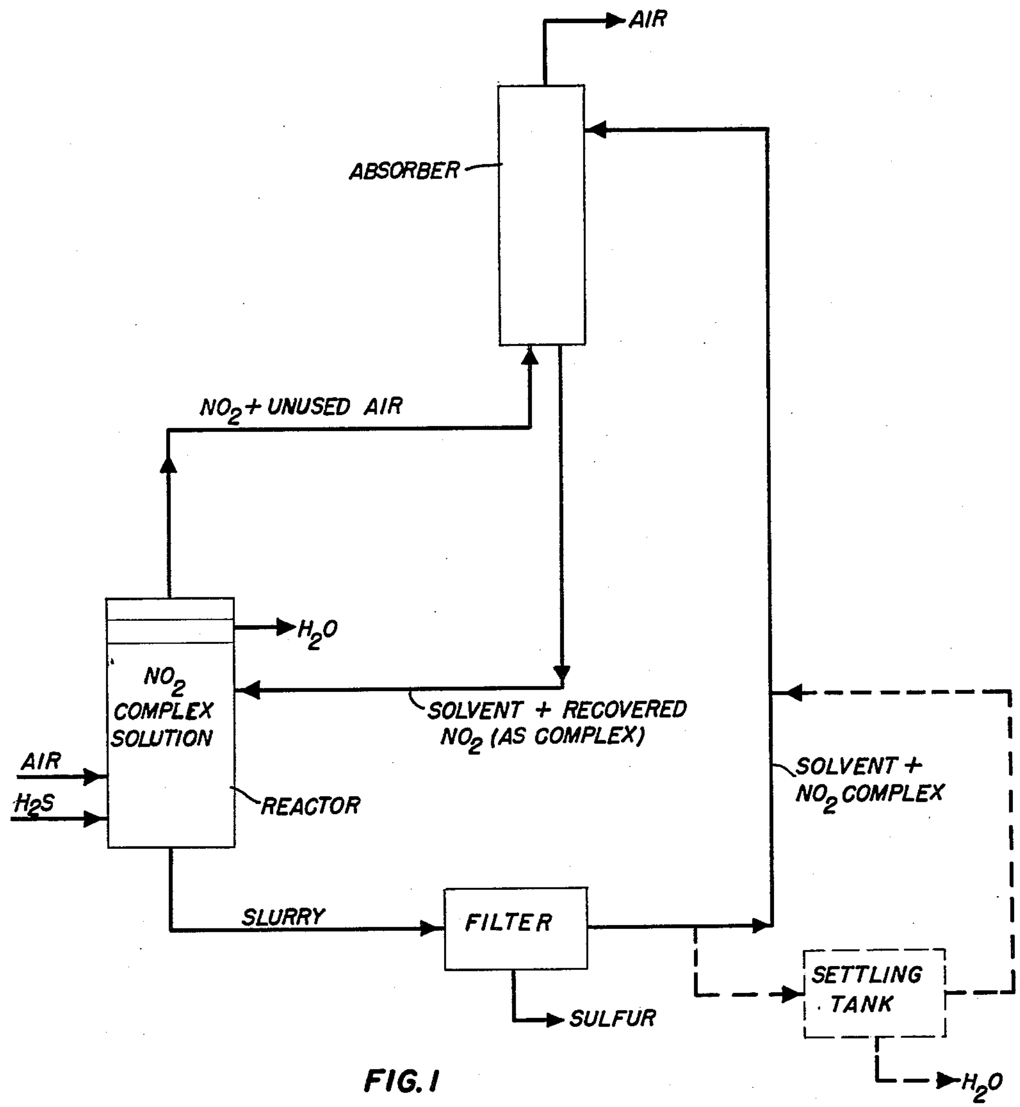

PREPARATION OF ELEMENTAL SULFUR FROM HYDROGEN SULFIDE

Filed Dec. 22, 1960 2 Sheets-Sheet 1

INVENTORS
WILLIAM L. FIERCE
ROGER L. WEICHMAN
BY Edward W. Sang
ATTORNEY

PREPARATION OF ELEMENTAL SULFUR FROM HYDROGEN SULFIDE

Filed Dec. 22, 1960 2 Sheets-Sheet 2

INVENTORS
WILLIAM L. FIERCE
BY ROGER L. WEICHMAN
Edward H. Sang
ATTORNEY

United States Patent Office 3,095,275
Patented June 25, 1963

1

3,095,275
PREPARATION OF ELEMENTAL SULFUR FROM HYDROGEN SULFIDE

William L. Fierce and Roger L. Weichman, Crystal Lake, Ill., assignors to The Pure Oil Company, Chicago, Ill., a corporation of Ohio Filed Dec. 22, 1960, Ser. No. 77,651
18 Claims. (Cl. 23—225)

This invention relates to a method of converting hydrogen sulfide to elemental sulfur. More particularly, this invention is concerned with the preparation of elemental sulfur from hydrogen sulfide or the removal of hydrogen sulfide from hydrocarbon gases by reaction with a nitrogen dioxide complex in solution.

Large quantities of hydrogen sulfide are recovered as the by-product of many industrial processes and in petroleum refining. A large part of this recovered hydrogen sulfide is converted into elemental sulfur by various modifications of the Claus process. In petroleum refining and in the treatment of various hydrocarbon gases, the removal of hydrogen sulfide is a difficult and costly step. The conversion of hydrogen sulfide in petroleum or hydrocarbon gases to elemental sulfur has the advantage of removing an undesirable contaminant and converting it to a marketable by-product.

In the conversion of hydrogen sulfide to elemental sulfur in the Claus process, part of the hydrogen sulfide is burned in air to form sulfur dioxide, which is treated with the remaining hydrogen sulfide at about 300° C. in the presence of a catalyst to form sulfur. Conversion to sulfur is about 95%, based on hydrogen sulfide charged, but reactant mol ratios must be very carefully controlled to obtain high sulfur yields. In the Datta Patent 1,313,370, there is disclosed a process for the oxidation of hydrogen sulfide to elemental sulfur by either nitrogen tetroxide or nitrogen trioxide in a gas phase. In the Datta process, some of the nitrogen tetroxide is continually swept from the reaction chamber in the exit gas. To recover nitrogen dioxide, the exit gas is passed through a packed tower in countercurrent contact with strong sulfuric acid which converts the nitrogen dioxide to nitrosylsulfuric acid. The nitrogen tetroxide is recovered, according to the patent, by heating nitrosylsulfuric acid or treating it with steam. In Morrell, Patent 2,009,898, there is described a process in which hydrocarbon distillates are refined by passing gaseous hydrocarbons in admixture with a nitrogen oxide diluted with an inert gas through an absorbent earth, such as fuller's earth. Nitrogen oxide is supplied to remove the sulfur compounds from the hydrocarbon vapors and the fuller's earth removes color-forming compounds, such as diolefins and highly unsaturated compounds which may be present.

Although the processes disclosed in the Datta and Morrell patents have been known for a long time in the art, there is no evidence of commercial use of either of the processes. One possible reason is that it is not as simple to recover the nitrogen oxides in the exit gas as suggested in the Datta patent. Information on the reaction of nitrogen dioxide with sulfuric acid is presented by L. H. Milligan in J. Phys. Chem., 28, 544 (1924). In contact with concentrated sulfuric acid, nitrogen dioxide is partially oxidized and partially reduced to produce nitrosylsulfuric acid and nitric acid. Nitrosylsulfuric acid is a white solid, melting at 75° C. with decomposition into nitrosylsulfuric anhydride and water. The decomposition of this compound to free nitrogen dioxide is very difficult. Likewise, nitric acid is not readily decomposed into nitrogen dioxide.

It is therefore one object of this invention to provide a new and improved process for the conversion of hydrogen sulfide into elemental sulfur.

2

Another object of this invention is to provide an improved process for the oxidation of hydrogen sulfide using a nitrogen dioxide complex in solution.

Another object of this invention is to provide an improved process for removal of hydrogen sulfide from hydrocarbon gases.

A feature of this invention is the provision of an improved process for conversion of hydrogen sulfide into elemental sulfur by contact with a solution of a nitrogen dioxide complex.

Another feature of this invention is the provision of an improved process for oxidation of hydrogen sulfide in which hydrogen sulfide is contacted with a solution of a nitrogen dioxide complex, and by-product nitric oxide is either concurrently or subsequently re-oxidized to nitrogen dioxide for further reaction with hydrogen sulfide.

Other objects and features of this invention will become apparent from time to time throughout the specification and claims as hereinafter related.

In accordance with this invention, we have devised a superior process for oxidation of hydrogen sulfide by contact with a solution of a nitrogen dioxide complex and provide for recovery of the nitrogen dioxide content of the effluent gases by contact with a solvent which forms an addition compound or complex of nitrogen dioxide. The resulting solution of solvent-nitrogen dioxide complex is passed to the reactor, where it is again contacted with hydrogen sulfide. In this process, it is unnecessary to remove the nitrogen dioxide from the absorbing solution before it is recycled as required in the processes of the prior art. Information on the preparation of properties of complexes of nitrogen dioxide is presented in Chem. Rev., 55, 1120 (1955). Addition compounds or complexes of nitrogen dioxide with various compounds in a 1:1 and 2:1 mol ratio have been observed with tertiary amines, ethers, nitriles, ketones, and other compounds. For example, 1,4-dioxane forms an addition compound with nitrogen dioxide which melts at 45.2° C. Other addition compounds reported are less stable and melt at low temperatures. In general, heating these complexes regenerates the original compounds. Among the specific compounds which are known to form complexes with nitrogen dioxide are ethers, such as diethyl ether, dioxane, and tetrahydrofuran; nitriles, such as acetonitrile, benzonitrile, phenylacetonitrile, and p-tolunitrile; tertiary amines, such as pyridine, quinoline, acridine, triethylamine, dimethylaniline, and N-methyldiphenylamine; acetone, benzophenone, ethyl acetate, acetic acid, nitrobenzene, benzaldehyde, diethylnitrosoamine, dimethylsulfoxide, and inorganic compounds, such as boron trifluoride, antimony pentafluoride, and arsenic pentafluoride. In general, the compounds which complex readily with nitrogen dioxide appear to be Lewis bases which are not strong reducing agents and relatively weak Lewis acids, such as acetic acid and the inorganic fluorides listed above.

In one embodiment of our process, as shown in the flow diagram in FIGURE 1, a reactor is charged with a solvent which is preferably immiscible with water and which complexes readily with nitrogen dioxide. The solvent is preferably denser than water, e.g., benzophenone or phenylacetonitrile, to cause the by-product water of reaction to separate and be removed from the top of the reaction liquid. A mixture of air and hydrogen sulfide is charged to the bottom of the reactor and mixed thoroughly with the solution of nitrogen dioxide complex. In this solution, the nitrogen dioxide oxidizes the hydrogen sulfide quantitatively to sulfur and water, and the air in the mixture re-oxidizes the by-product nitric oxide to nitrogen dioxide. The exit gas from the reactor contains unused air and nitrogen dioxide stripped from the reaction liquid. The effluent gas is passed through an absorber and contacted with a portion of solution withdrawn from the main reactor so that the nitrogen dioxide in the effluent gas is absorbed in the form of a solvent-nitrogen dioxide complex. The resulting solution of the nitrogen dioxide complex is returned to the main reactor for further reaction with hydrogen sulfide. In the main reactor, a slurry is formed as the result of the oxidation of hydrogen sulfide and this slurry is withdrawn and the sulfur separated therefrom. The sulfur may be separated by filtration, centrifugation, etc. After separation of the sulfur, the solution of nitrogen dioxide complex is passed to the absorber for recovery of nitrogen dioxide in the effluent gas from the main reactor, and then returned to the main reactor. The by-product water of reaction rises to the top of the liquid in the reactor and is drained off continuously through an overflow line. Because some nitrogen dioxide is absorbed in the water, a stripping operation may be used to achieve maximum utilization of the nitrogen dioxide. If the solvent used is lighter than water, e.g., dimethyl aniline, diethyl ether and p-tolunitrile, the process is modified slightly, as shown by dashed lines in FIGURE 1, in that the water is drained from the bottom of the reactor with the solvent-sulfur slurry and is separated from the solvent in a settling tank downstream from the filter or centrifuge. It is possible to use a solvent which is miscible with the water, but a separate step is required to remove the water. In such a case, the solvent would have to be stripped from the solvent-water solution leaving the filter or centrifuge.

The following example is illustrative of the scope of this invention.

*Example I*

A gaseous mixture of nitrogen dioxide (75 cc./min.) and helium (30 cc./min.) was bubbled through 100 ml. of p-dioxane for 35 minutes at room temperature. The weight of nitrogen dioxide charged was 4.2 g. and the increase in weight of the bubbler and contents was 3.2 g. Then, hydrogen sulfide (40 cc./min.) and oxygen (66 cc./min.) were bubbled through for 135 minutes. Sulfur was formed in the reaction in a yield of 146%, based on the total nitrogen dioxide charged. It is apparent from this experiment that the nitrogen dioxide oxidized the hydrogen sulfide substantially quantitatively, and the nitrogen dioxide was regenerated by reaction of by-product nitric oxide with oxygen in the mixture.

The effluent gas from the mixture is withdrawn and passed through a packed absorber countercurrent to a stream of nitrogen dioxide-dioxane complex solution. The slurry of sulfur from the main reactor is withdrawn, filtered, and the solvent and complex stripped from water of reaction. A solvent-nitrogen dioxide complex is then passed to the absorber for recovery of nitrogen dioxide in the effluent gases from the reactor.

*Example II*

Gaseous nitrogen doxide is bubbled through benzophenone at 20° C. until a saturated solution of nitrogen dioxide-benzophenone complex is obtained. A mixture of hydrogen sulfide and air is then bubbled through the solution. The conversion of hydrogen sulfide to sulfur and water is substantially quantitative. In the reactor, the by-product water of reaction floats on the surface of the reaction liquid and is withdrawn through an overflow line. The nitrogen dioxide absorbed in the water of reaction is recovered by stripping with nitrogen and is returned to the reactor. The slurry of sulfur which is formed in the reactor is withdrawn and the sulfur separated therefrom in a centrifuge. The nitrogen dioxide complex solution withdrawn from the centrifuge is then passed into an absorber countercurrently to the effluent gas from the main reactor to recover entrained nitrogen dioxide in the reaction effluent. The solution of nitrogen dioxide complex is then returned to the main reactor for further reaction with hydrogen sulfide.

When this run is repeated omitting oxygen or air from the hydrogen sulfide stream, the conversion of hydrogen sulfide is about 95%. However, the complex is decomposed liberating nitric oxide, which must be re-oxidized. The gas leaving the absorber is oxidized by contact with air (or oxygen) which regenerates the nitrogen dioxide. The nitrogen dioxide is then absorbed in the absorber and recycled as a nitrogen dioxide complex to the reactor for further reaction with hydrogen sulfide.

Figure 2:
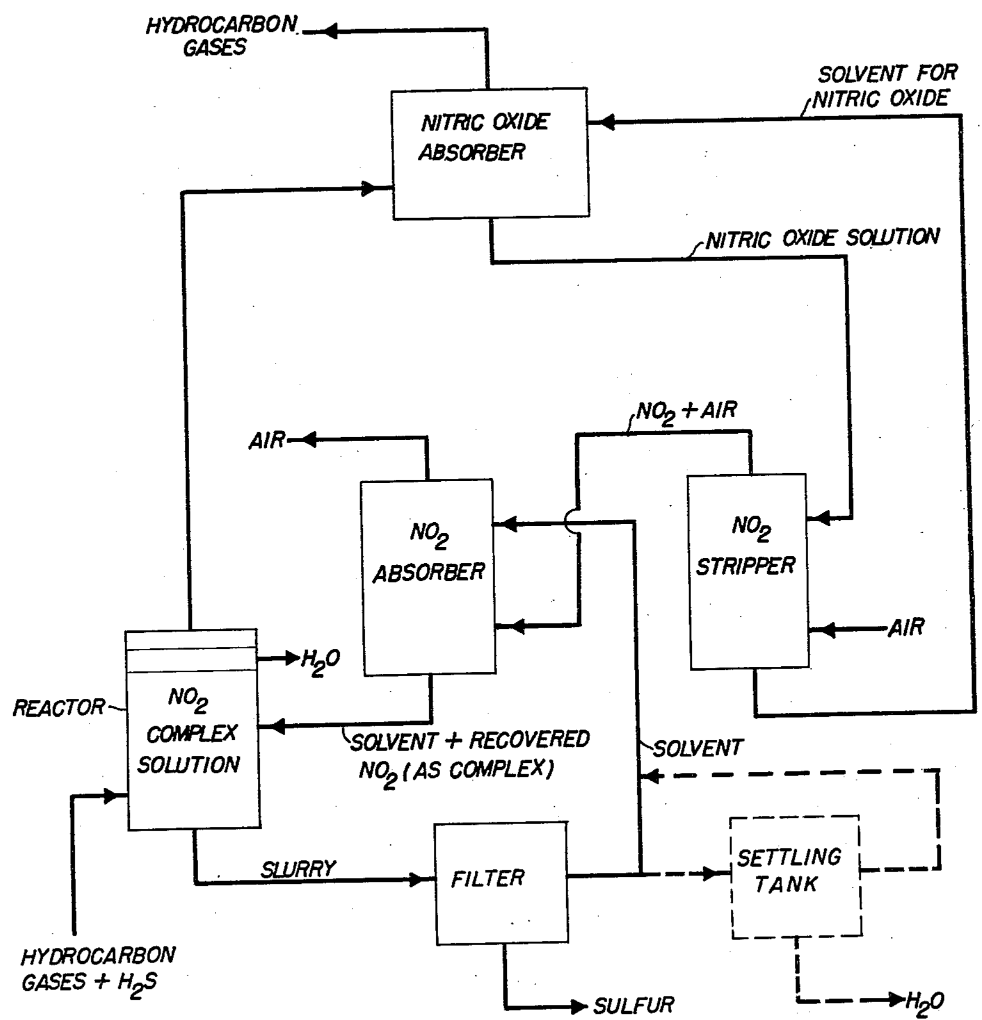

In an alternate embodiment of the invention, as shown in the flow diagram in FIG. 2, our process may be used for removing hydrogen sulfide present as an impurity in hydrocarbon gases. In this form, our process performs a dual function of purifying a sour hydrocarbon gas and recovering elemental sulfur as a by-product. In this form of the invention, a hydrogen sulfide-containing hydrocarbon gas is contacted with a solution of nitrogen dioxide complex (as previously defined) in a reactor to oxidize the hydrogen sulfide to elemental sulfur. A slurry of sulfur and solvent is withdrawn from the reactor and the sulfur separated in a filter or centrifuge. When the solvent used is denser than water, the by-product water is removed through an overflow line from the reactor, as shown in FIG. 2. When the solvent used is lighter than water, the by-product water is removed with the sulfur-solvent slurry and separated in a settling tank downstream from the filter (as shown in dashed lines in FIG. 2).

The gaseous effluent from the reactor, consisting essentially of hydrocarbon gases and nitric oxide (NO), is passed to an absorber where the nitric oxide is absorbed in a solvent, such as aqueous ferrous sulfate, and the hydrocarbon gases are recovered. The nitric oxide solution is circulated to a stripper where air is introduced at the bottom and a mixture of air and $NO_2$ withdrawn at the top. The solvent (ferrous sulfate solution) denuded of nitric oxide is recycled to the nitric oxide absorber. The mixture of air and $NO_2$ from the stripper is circulated to a second absorber and contacted with the solvent filtrate from the filter. In the second absorber the $NO_2$ is absorbed and recovered in the form of a solution of the $NO_2$ complex while air from the $NO_2$-air mixture is vented to atmosphere. The solution of the $NO_2$ complex is recycled to the reactor for further reaction with $H_2S$ in the hydrocarbon gases.

The following example is illustrative of the scope of this embodiment of the invention.

*Example III*

A gaseous mixture of nitrogen dioxide and helium is bubbled through p-dioxane at room temperature as in Example I until a saturated solution of nitrogen dioxide-dioxane complex is formed. Then a mixture of hydrogen sulfide and propane (any other gaseous hydrocarbon or mixture of hydrocarbons may be used) is passed through the solution at room temperature with the result that the hydrogen sulfide is oxidized to sulfur in substantially quantitative yield. There is no appreciable oxidation of the hydrocarbon by the nitrogen dioxide in this reaction. The effluent gas stream (propane and nitric oxide) from the reactor is contacted in an absorber with an aqueous solution of ferrous sulfate which absorbs the nitric oxide. The resulting solution of nitric oxide is then circulated to a stripper and aerated to release nitric oxide which is oxidized to nitrogen dioxide. The mixture of air and nitrogen dioxide from the stripper is then circulated to a second absorber for recovery of the nitrogen dioxide in the form of a nitrogen dioxide-dioxane complex. The unused air is vented from the absorber. From the reactor, the slurry of sulfur which is formed as a result of oxidation of the hydrogen sulfide is withdrawn and filtered. The solvent is then passed to the second absorber for recovery of nitrogen dioxide from the aforementioned air-nitrogen dioxide mixture. The resulting solution of nitrogen dioxide-dioxane complex is recirculated to the reactor.

While we have described our invention fully and completely with special emphasis upon several preferred embodiments of the invention, we wish it understood that this invention may be practiced otherwise than as specifically described and claimed herein.

The embodiments of the invention in which an exclusive property or privilege is claimed are defined as follows:

1. A method of converting hydrogen sulfide to elemental sulfur which comprises passing hydrogen sulfide-containing gas through a solution of a nitrogen dioxide complex, said nitrogen dioxide complex being an addition compound of nitrogen dioxide and a compound other than either nitrogen dioxide or water, whereby hydrogen sulfide is oxidized to elemental sulfur and water with nitric oxide being formed as a by-product, and separating elemental sulfur precipitated in said solution.

2. A method in accordance with claim 1 in which by-product nitric oxide from the reaction is re-oxidized to nitrogen dioxide for further reaction with hydrogen sulfide.

3. A method in accordance with claim 1 in which oxygen is introduced with the hydrogen sulfide to continually regenerate the nitrogen dioxide in said solution.

4. A method in accordance with claim 1 in which said complexing agent and solvent are the same compound, and the effluent gases from the reaction are contacted with a portion of the solvent to recover nitrogen dioxide therefrom.

5. A method in accordance with claim 4 in which the solution is filtered to recover precipitated sulfur and the filtrate is contacted with the effluent gases to recover nitrogen dioxide therefrom.

6. A method in accordance with claim 1 in which the nitrogen dioxide complex is an addition compound of nitrogen dioxide with a compound selected from the group consisting of diethyl ether, dioxane, tetrahydrofuran, acetonitrile, benzonitrile, phenylacetonitrile, p-tolunitrile, pyridine, quinoline, acridine, triethylamine, dimethylaniline, N-methyldiphenylamine, acetone, benzophenone, ethyl acetate, acetic acid, nitrobenzene, benzaldehyde and diethylnitrosoamine.

7. A method in accordance with claim 1 in which the nitrogen dioxide complex is an addition compound of nitrogen dioxide with a compound selected from the group consisting of boron trifluoride, antimony pentafluoride, and arsenic pentafluoride.

8. A method of converting hydrogen sulfide to elemental sulfur which comprises passing a mixture of hydrogen sulfide and air through a solution of a nitrogen dioxide complex in a reactor, said nitrogen dioxide complex being an addition compound of nitrogen dioxide and a compound other than either nitrogen dioxide or water, whereby hydrogen sulfide is oxidized to elemental sulfur and water with nitric oxide being formed as a by-product, and air re-oxidizes the by-product nitric oxide to nitrogen dioxide, filtering the precipitated sulfur from said solution, contacting the filtrate with the effluent gases to absorb nitrogen dioxide therefrom, and recycling the resulting nitrogen dioxide complex solution to the reactor for further reaction with hydrogen sulfide.

9. A method in accordance with claim 8 in which the solution is denser than water, and water of reaction is removed from the top of the solution.

10. A method in accordance with claim 8 in which the solution is lighter than water, and the water of reaction is withdrawn from the reactor and removed in a settling tank downstream from the filter prior to contacting the filtrate with the effluent gases for recovery of nitrogen dioxide.

11. A method in accordance with claim 8 in which the mixture of hydrogen sulfide and air is passed through a solution of nitrogen dioxide-dioxane complex in dioxane.

12. A method in accordance with claim 8 in which the mixture of hydrogen sulfide and air is passed through a solution of nitrogen dioxide-benzophenone complex in benzophenone.

13. A method in accordance with claim 8 in which the nitrogen dioxide complex is an addition compound of nitrogen dioxide with a compound selected from the group consisting of diethyl ether, dioxane, tetrahydrofuran, acetonitrile, benzonitrile, phenylacetonitrile, p-tolunitrile, pyridine, quinoline, acridine, triethylamine, dimethylaniline, N-methylidphenylamine, acetone, benzophenone, ethyl acetate, acetic acid, nitrobenzene, benzaldehyde and diethylnitrosoamine.

14. A method in accordance with claim 8 in which the nitrogen dioxide complex is an addition compound of nitrogen dioxide with a compound selected from the group consisting of boron trifluoride, antimony pentafluoride, and arsenic pentafluoride.

15. A method of removing hydrogen sulfide from hydrocarbon gases which comprises passing a hydrocarbon gas containing hydrogen sulfide through a solution of nitrogen dioxide complex in a reactor, said nitrogen dioxide complex being an addition compound of nitrogen dioxide and a compound other than either nitrogen dioxide or water, whereby hydrogen sulfide is oxidized to elemental sulfur and water with nitric oxide being formed as a by-product, withdrawing the solution from the reactor and filtering the precipitated sulfur therefrom, contacting the effluent gases from the reactor with a solvent selective for nitric oxide, whereby nitric oxide is absorbed by said solvent, aerating the resulting solvent solution of nitric oxide to produce a gaseous effluent containing nitrogen dioxide, contacting the nitrogen dioxide-containing gaseous mixture with the filtrate from the reactor to absorb the nitrogen dioxide in the form of a complex with the solvent, and recirculating the resulting nitrogen dioxide complex solution to the reactor for further reaction with hydrogen sulfide in the hydrocarbon gases.

16. A method in accordance with claim 15 in which the nitrogen dioxide complex is an addition compound of nitrogen dioxide with a compound selected from the group consisting of boron trifluoride, antimony pentafluoride, and arsenic pentafluoride.

17. A method in accordance with claim 15 in which the solvent used to recover nitric oxide from the gaseous effluent consists of an aqueous solution of ferrous sulfate.

18. A method in accordance with claim 15 in which the nitrogen dioxide complex is an addition compound of nitrogen dioxide with a compound selected from the group consisting of diethyl ether, dioxane, tetrahydrofuran, acetonitrile, benzonitrile, phenylacetonitrile, p-tolunitrile, pyridine, quinoline, acridine, triethylamine, dimethylaniline, N-methyldiphenylamine, acetone, benzophenone, ethyl acetate, acetic acid, nitrobenzene, benzaldehyde and diethylnitrosoamine.

References Cited in the file of this patent

UNITED STATES PATENTS 1,313,370 Datta ------------------ Aug. 19, 1919

OTHER REFERENCES

Kingzett's "Chemical Encyclopedia," Third Ed., 1924, page 380. D. Van Nostrand Co., N.Y.

Hackh's "Chemical Dictionary," Second Ed., 1937, page 242, P. Blakiston's Son and Co., Inc. Philadelphia, Pa.